United States Patent
Zacay

(10) Patent No.: US 7,164,262 B2
(45) Date of Patent: Jan. 16, 2007

(54) IN-HEAD CONVERTER WITH DISPLAY

(76) Inventor: Ely Zacay, 20 Hametzuda Street, Azur 58190 (IL)

( * ) Notice: Subject to any disclaimer, the term of this patent is extended or adjusted under 35 U.S.C. 154(b) by 60 days.

(21) Appl. No.: 10/797,744

(22) Filed: Mar. 10, 2004

(65) Prior Publication Data

US 2004/0209524 A1    Oct. 21, 2004

Related U.S. Application Data

(63) Continuation-in-part of application No. PCT/IL02/00746, filed on Sep. 9, 2002.

(51) Int. Cl.
*G01R 15/00* (2006.01)
*G01R 1/04* (2006.01)
*G01L 7/00* (2006.01)
*G01K 7/00* (2006.01)

(52) U.S. Cl. .................. 324/115; 73/700; 324/156; 374/163

(58) Field of Classification Search .................. None
See application file for complete search history.

(56) References Cited

U.S. PATENT DOCUMENTS

| | | | |
|---|---|---|---|
| 3,943,498 A | * | 3/1976 | McClelland et al. ... 340/870.02 |
| 5,225,816 A | | 7/1993 | Lebby et al. |
| 6,023,160 A | * | 2/2000 | Coburn ........................ 324/142 |
| 6,095,850 A | | 8/2000 | Liu |
| 6,347,958 B1 | | 2/2002 | Tasi |
| 6,491,978 B1 | | 12/2002 | Kalyanam |

OTHER PUBLICATIONS

International Search Report and Written Opinion for International Application No. PCT/US04/42001., Mailed Mar. 23, 2006.

* cited by examiner

*Primary Examiner*—Ernest Karlsen
(74) *Attorney, Agent, or Firm*—Fenster & Company

(57) ABSTRACT

A typical probe comprises a sensor, and a connection head that includes a conversion circuit for driving the sensor. The probe communicates with a controller via a two wire DC 4-20 mA link. The conversion circuit is also known as a two-wire transmitter. The conversion circuit and the sensor are connected to each other (and to the external link) via screw terminals usually located at the circuit top face. The invention provides a conversion circuit and a matching base forming plug and socket type connections. On the converter circuit, the connections are moved from the top of the circuit, to the bottom of the circuit, thus clearing space for an integral display. The sensor and the link wires are attached to the base socket. The conversion circuit fits into the socket in only a single orientation, thus ensuring correct coupling of the wires to the circuit elements.

20 Claims, 2 Drawing Sheets

IN-HEAD CONVERTER WITH DISPLAY

CROSS-REFERENCE TO RELATED APPLICATIONS

The present application is a continuation-in-part application of and claims priority under 35 U.S.C. § 120 from International Application No. PCT/IL02/00746, which has an international filing date of Sep. 9, 2002 and is hereby incorporated by reference. International Application No. PCT/IL02/00746 claims Paris Convention priority from Israel Patent Application No. 145391, which was filed on Sep. 11, 2001.

FIELD OF THE INVENTION

The present invention relates to industrial sensing probes.

BACKGROUND OF THE INVENTION

Many types of industrial processes are monitored using industrial sensing probes. Such probes are available in standard sizes. A typical probe comprises a sealed connection head that includes an opening for the extension of a probe sensor into the machine and a connection head internal volume in which a conversion circuit for driving the sensor is encased and protected from the environment. The probe can communicate with a remote controller via a two-wire 4–20 mA current loop (the conversion circuit is also known as a two-wire transmitter), or via data link.

In operation, the sensor senses a machine parameter such as temperature or pressure. The conversion circuit drives the sensor to generate a raw sensor signal indicating the sensed parameter and converts this signal into a DC signal that meets the 4–20 mA standard. It should be noted that the same DC link is typically used for both power input and signal output. In some implementations, the link is also used for programming the conversion circuit.

In the industry, the conversion circuit and the sensor are considered an integral unit with the rest of the probe. Thus, they are connected to each other (and to the external link) via screw terminals. If the circuit or the probe needs to be replaced, a skilled person is required to open the terminals and ensure correct matching of the wires to the terminals on the circuit. Periodic testing of all the conversion circuits in a factory is thus often a particular laborious activity.

In some cases, users are interested in reading the measurements at a machine. As the probe and circuit are considered integral, one solution is to manufacture the circuit with an external plug for attaching an add-on display to the probe. Another, well known, solution is to provide a separate display unit that sits on the DC link and is powered by the link. Being separate, this display unit requires separate circuitry and is typically as expensive as a conversion circuit. In addition, when the conversion circuit is calibrated, re-programmed or used for a different type of sensor, also the display needs to be adjusted.

SUMMARY OF THE INVENTION

In accordance with an exemplary embodiment of the invention, it is realized that the conversion circuit should be considered as a separate unit from the rest of an industrial probe. While from a functional point of view the conversion circuit is integral with the sensor and the link, from a maintenance point of view, the circuit is an electronic component which typically requires more frequent servicing, replacement and/or calibration.

In accordance with this realization, in an exemplary embodiment of the invention, the connections between the circuit and the rest of the probe (e.g., sensor, connection head and external link) are simplified, so that a new circuit can be easily replaced, even by a less skilled person. In an exemplary embodiment of the invention, the conversion circuit can be removed with one, two or three simple actions, instead of the currently required 4–6 unscrewing of terminals. Alternatively or additionally, reconnection of the conversion circuit is achieved with one, two or three simple actions, such as inserting the circuit into the base socket, instead of the currently required 4–6 screwing of terminals and 2 driving of screws.

Alternatively or additionally, a display is made integral with the circuit, in the same sealing casing. In an exemplary embodiment of the invention, the connections to the conversion circuit are moved from the top of the circuit (where they are located, in the art), to the bottom of the circuit, thus clearing space for a display, possibly a display as large as a top face of the conversion circuit.

In an exemplary embodiment of the invention where a conversion circuit is integrated with a display into a single sealed unit, a matching base socket is provided. The sensor and the link wires are attached to the socket. The conversion circuit fits into the socket in only a single orientation, thus ensuring correct coupling of the wires to the circuit elements.

Typical and generally desirable results are that the circuit and display as a unit are cheaper to manufacture (fewer components), that there are no open plugs in the probe that may serve as the starting point of moisture penetration or corrosion and/or that a damaged circuit can easily be replaced and/or upgraded, in a short time. Optionally, the connection head is made transparent, so that the display may be viewed while the case is closed.

In an exemplary embodiment of the invention, the circuit is easily removed for testing of the circuit and/or the probe. Optionally, a circuit testing device includes a socket similar to that of the connection head, into which a circuit can be easily placed for testing. This can potentially allow ISO testing and logging of the many circuits of a factory to be performed regularly, rapidly and with a much reduced (or eliminated) change of misconnection of the circuits during testing.

There is thus provide din accordance with an exemplary embodiment of the invention, a conversion circuit component, comprising:

a sealed unit body;

a sensor conversion and transmission circuitry enclosed by said body;

a display enclosed by said body; and a plurality of electrical contacts mounted on said body, including a first plurality of contacts for interaction with an external sensor, a second plurality of contacts for interaction with an external link and a third plurality of contacts for interaction with an external programmer. Optionally, said plurality of contacts comprises pressure contacts that mate with a plurality of contacts base socket, and comprising a quick connector for quick connection of said body to said base socket.

Alternatively or additionally, said circuitry is designed to mount in an industry standard connection head. Alternatively or additionally, said circuitry is designed to interface with an industry standard sensor. Alternatively or additionally, said circuitry is designed to interface with an industry standard links. Alternatively or additionally, said display is on a same side of said body as at least some of said contacts. Alternatively, said display is on an opposite side of said body from said contacts.

There is also provided in accordance with an exemplary embodiment of the invention, a method of coupling a sensor conversion circuit to a sensor mounted in a sensor probe connection head, comprising essentially of:

attaching a plurality of wires from said sensor to a base socket;

attaching a plurality of wires from an external link to said base socket; and inserting said circuit into said base socket. Optionally, the method comprises pre-attaching said base socket to said connection head.

There is also provided in accordance with an exemplary embodiment of the invention, a base socket comprising:

a body adapted to mount inside a standard connection head of an industrial sensing probe and be attached via standard connection means of said connection head;

a plurality of terminals for attaching wires associated with said probe to said socket;

a plurality of contacts, each associated with one of said wires; and a mechanical lock adapted to engage and align a circuitry component such that said contacts align with contacts of said circuitry. Optionally, the base socket is incorporated in a conversion circuit testing device. Alternatively or additionally, the base socket is incorporated in a conversion circuit programming device.

BRIEF DESCRIPTION OF FIGURES

Particular non-limiting embodiments of the invention will be described with reference to the following description of embodiments in conjunction with the figures. Identical structures, elements or parts which appear in more than one figure are preferably labeled with a same or similar number in all the figures in which they appear, in which.

DETAILED DESCRIPTION OF EMBODIMENTS

Figure 1:
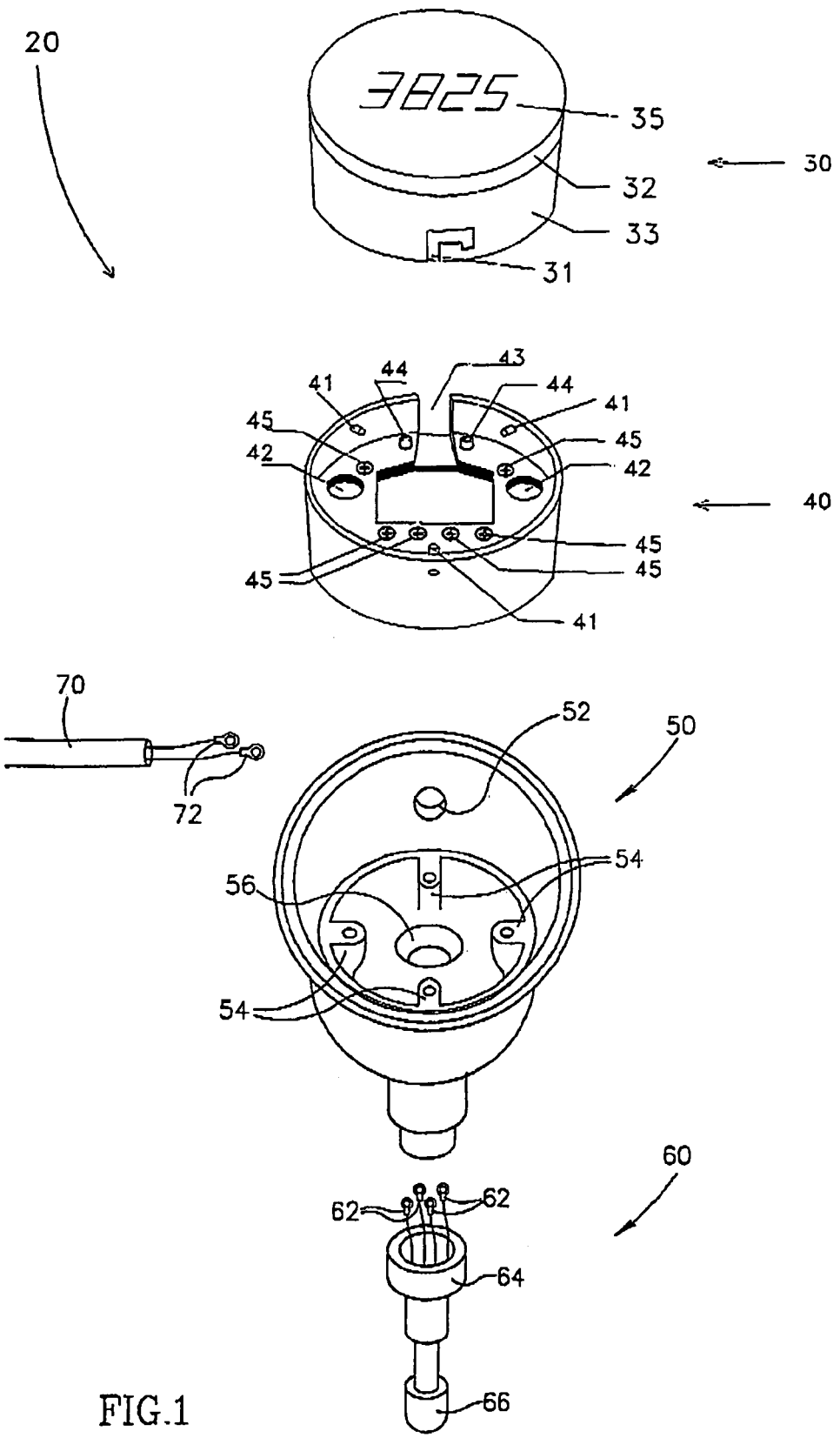
FIG. 1 is a schematic illustration of an exploded view of a probe unit in accordance with an exemplary embodiment of the invention.

FIG. 1 is a schematic illustration of an exploded view of an industrial sensing probe 20 in accordance with an exemplary embodiment of the invention. Sensing probe 20 is optionally of a standard size as is known in the art and for which industrial machines that need to be monitored are designed.

Probe 20 comprises a connection head 50, a sensor 60, an external wire link 70, all of which are optionally standard components. In addition, probe 20 includes a conversion circuitry component 30 and a matching base socket 40, which, in accordance with an exemplary embodiment of the invention, are different from the single element standard conversion circuitry known in the art.

In an exemplary embodiment of the invention, connection head 50 comprises an opening 56 adapted to receive sensor 60, an opening 52 adapted to receive an external wire link 70 and a plurality of fixation points, for example, threaded holes 54, for attaching base socket 40. Optionally, threaded holes 54 are sized and/or located as the standard holes are used for attaching a circuit to the connection head, in prior art devices. Connection head 50 optionally includes a cap (not shown) which is optionally transparent or includes a window. In an exemplary embodiment of the invention, connection head 50 provides environmental protection, for example, being waterproof, airtight, and/or EMI protected.

Conversion circuitry component 30, optionally with an integrated display 35 (optionally located behind the top cover 32), is designed to fit into base socket 40, reliably forming mechanical and electrical connections. In an exemplary embodiment of the invention, component 30 is sealed against the environment and/or provides EMI or other protection to its internal sub-components.

Sensor 60 is optionally a standard component and may be of any type known in the art, for example, a temperature or a humidity sensor. For example, sensor 60 comprises a sensing tip 66 mounted on a body 64 that is adapted to seal case 50. A plurality of wires 62 extend from sensor 60 and are connected to base socket 40. The number of wires, as well as the function of conversion circuitry 30 may vary, for example, depending on the type of probe, measurement type and the number of sensors.

External link 70, comprising, for example two wires 72 is optionally a standard external link wire for 4–20 mA power and data communication. Wires 72 are also connected to base socket 40.

Base socket 40 is designed to be mechanically fixed to connection head 50, for example using one or more screws 42, which are optionally designed to match the standard holes 54 which are designed for attaching a circuitry component in the prior art devices. Alternatively other connection means as known in the art may be used.

Figure 3:
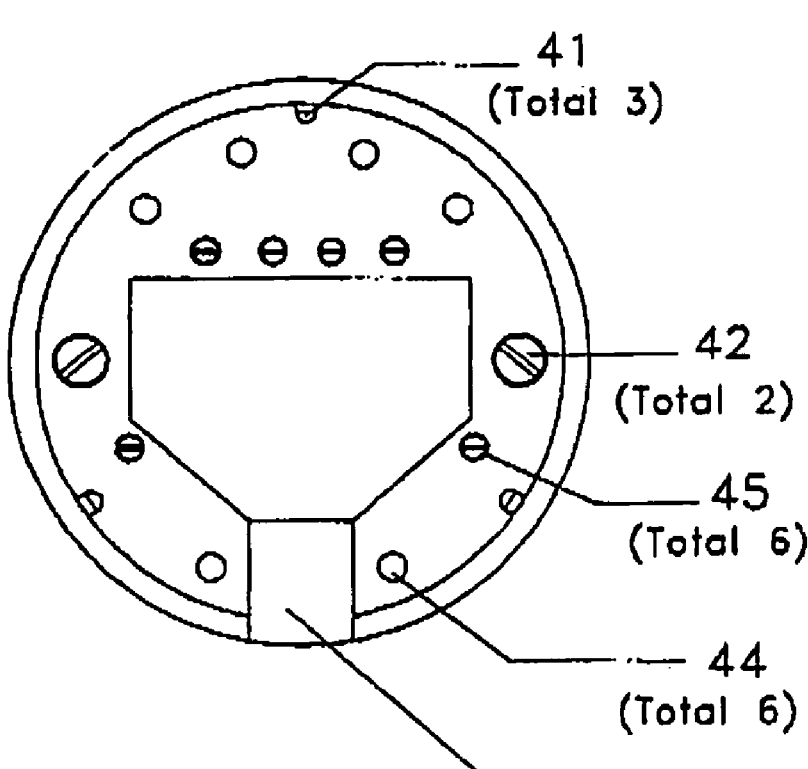
FIG. 3 is a schematic illustration of a top view of a sealed unit base, in accordance with an exemplary embodiment of the invention.

FIG. 3 shows a top view of socket 40, including a plurality of terminal screws 45 for attaching wires 62 and wires 72 to socket 40. Other terminal types may be used as well, for example clip terminals. Alternatively or additionally, at least some of the wires may connect on the top of socket 40, for example, being led in channel or groove 43 on the upper surface of socket 40. In an exemplary embodiment of the invention, socket 40 defines an aperture between the terminals. Optionally, the aperture allows wires 62 to be inserted into sides of terminals 45, and possibly accessed, even after socket 40 is attached to connection head 50.

Figure 2:
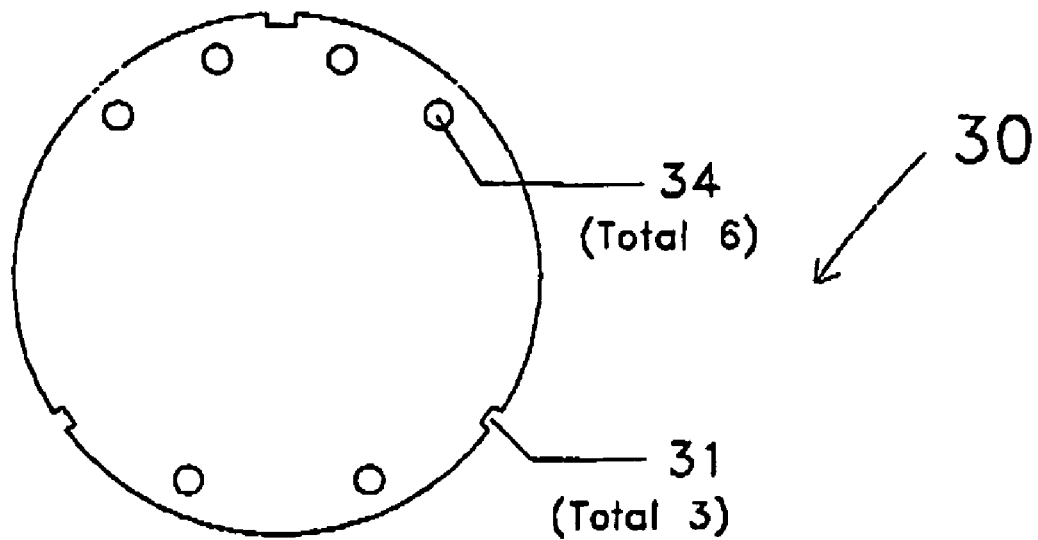
FIG. 2 is a schematic illustration of a bottom view of a sealed unit, in accordance with an exemplary embodiment of the invention.

Each such terminal includes a corresponding contact 44 for electrical connection to conversion circuitry 30. FIG. 2 is a bottom view of conversion circuitry 30 showing a plurality of contact pads 34 for contacting terminal contacts 44. In an exemplary embodiment of the invention, pads 34 are flush, to prevent entry of the environment into the body of conversion circuitry 30. Contacts 44 are optionally spring-backed, for example being in the form of spring-loaded pins, to ensure good contact between contacts 44 and pads 34 when conversion circuitry 30 is placed into base socket 40. Alternatively or additionally, pads 34 may be spring loaded.

In an exemplary embodiment of the invention, the mechanical connection between conversion circuitry 30 and socket 40 ensures correct alignment of contacts 44 and pads 34. Alternatively or additionally, the mechanical connection is a quick connection that is easy to make and/or unmake. FIGS. 1–3 show details of an exemplary connection method, however, in some embodiments, socket 40 may be integrated into conversion circuitry 30 or connection head 50. Alternatively other fast connection methods as known in the art of electrical connectors, may be used. For example, a prong and apertures type connection, as used in electrical sockets or bayonet (twist and lock) type connection, may be used for both mechanical and electrical coupling between conversion circuitry 30 and socket 40.

An exemplary locking mechanism is a spring loaded twist locking mechanism that locks into position; and is pushed in and twisted back in order to be removed.

In an exemplary embodiment, contacts 44 are spring loaded, as described above. Rotational alignment of conversion circuitry 30 and socket 40 is optionally achieved by the location of notches 31 defined in body 33 and matching protrusion pins 41 in socket 40. Notches 31 are designed to guide locking pins 41, of socket 40, into their locking position. Applying sufficient force on the conversion circuitry against spring loaded pins 44 together with small rotational movement, guides pins 41 to their final resting/locking position. The conversion circuitry is held in place due the pressure applied by the contact pins 44. An a-symmetrical positioning of the pins 41 and notches 31, ensures only one matching position.

Alternatively or additionally, socket 40 and conversion circuitry 30 are not rotationally symmetrical.

One application where such fast connection and/or disconnection may be useful is in testing (e.g., periodic) and calibrating of the conversion circuits. A typical factory may include hundreds or thousands of circuits which need to be tested, the tests require to remove the circuits form their connection heads and insert them into a test circuit. In an exemplary embodiment of the invention, the test circuit is designed with a socket base as in or similar to socket base 40. A conversion circuit can be simply removed from its connection head, placed in the test circuit and then returned to its connection head.

Alternatively or additionally, a sensor testing kit in accordance with an exemplary embodiment of the invention, includes a testing head similar in shape and connector location as converter 30, and inserted into socket 40 in order to test sensor 60 and/or link 70. Alternatively or additionally, a separate plug is provided for testing in base socket 40.

Conversion circuitry 30 and base socket 40 may be provided, for example, as a kit, possibly including a transparent cap for connection head 50, possibly for use in retrofitting an existing probe. Alternatively, for example, the various components described above may be provided as separate items or in other packaging methods. For example, sockets may be sold with connection heads and conversion circuits may be sold in the traditional manner. Alternatively or additionally, a complete industrial probe 20 or testing circuit is sold as a unit.

The present invention has been described using non-limiting detailed descriptions of embodiments thereof that are provided by way of example and are not intended to limit the scope of the invention. It should be understood that features and/or steps described with respect to one embodiment may be used with other embodiments and that not all embodiments of the invention have all of the features and/or steps shown in a particular figure or described with respect to one of the embodiments. For example, not all implementations in accordance with some embodiments of the invention, require an integral display. Variations of embodiments described will occur to persons of the art, for example, in the type of mechanical and/or electrical connections. The description of apparatus above encompasses the method of use of the apparatus, for example the modification of a standard testing procedure (or replacement procedure) to include the simple removal and insertion of a conversion circuitry.

It is noted that some of the above described embodiments may describe the best mode contemplated by the inventors and therefore may include structure, acts or details of structures and acts that may not be essential to the invention and which are described as examples. Structure and acts described herein are replaceable by equivalents which perform the same function, even if the structure or acts are different, as known in the art. For example, the sides of base socket 40 (or extensions thereof) may rise higher, possibly reaching the top and/or engaging the top of conversion circuit 30 and providing mechanical connection between conversion circuit 30 and base socket 40. In another example, base socket 40 and conversion circuit 30 may connect differently. Therefore, the scope of the invention is limited only by the elements and limitations as used in the claims. When used in the following claims, the terms "comprise", "include", "have" and their conjugates mean "including but not limited to".

The invention claimed is:

1. A conversion circuit component which mates to a base socket, comprising:
    a sealed unit body;
    a sensor conversion and transmission circuitry enclosed by said body;
    a display enclosed by said body; and
    a plurality of electrical contacts mounted on said body, including a first plurality of contacts for interaction with an external sensor and a second plurality of contacts for interaction with an external link,
    wherein the external link comprises a data link supplying DC power to the transmission circuitry.

2. A component according to claim 1, wherein said plurality of electrical contacts mate with a plurality of electrical pressure contacts located on said base socket.

3. A component according to claim 1, wherein said body forms together with said base socket a quick connector for quick electrical connection of said body to said socket.

4. A component according to claim 1, wherein said circuitry is designed to mount in an industry standard connection head.

5. A component according to claim 1, wherein said circuitry is designed to interface with an industry standard sensor.

6. A component according to claim 1, wherein said circuitry is designed to interface with an industry standard link.

7. The component according to claim 1 wherein the base socket is comprised of:
    a body adapted to mount inside a standard connection head of an industrial sensing probe and be attached via standard connection means of said connection head;
    a plurality of terminals for attaching wires associated with said probe to said socket;
    a plurality of contacts, each associated with one of said wires; and
    a mechanical lock adapted to engage and align a circuitry component such that said contacts align with contacts of said circuitry.

8. A component according to claim 1, wherein said display is on a same side of said body as at least some of said contacts.

9. A component according to claim 1, wherein said display is on an opposite side of said body from said contacts.

10. The component according to claim 1 further comprising a third plurality of contacts for interaction with an external programmer.

11. A component according to claim 1 wherein the external link comprises a 4–20 mA link.

12. A component according to claim 1 wherein the external sensor is adapted to sense pressure.

13. A component according to claim 1 wherein the external sensor is adapted to sense temperature.

14. A method for monitoring an industrial process comprising:
   providing a factory including industrial machines;
   sensing the industrial process of each of said machine by inserting an industrial sensing probe in an opening in said machine;
   mounting a base socket to said sensing probe; and
   connecting a conversion circuit component as defined in claim 1 to said base socket using a quick connection.

15. A method according to claim 14 wherein the industrial sensing probe senses at least one of temperature and pressure.

16. A method according to claim 14 wherein said circuit can be removed from the base socket by performing not more than three separate acts.

17. A method according to claim 14 wherein said circuit can be connected to the base socket by performing not more than three separate acts.

18. A method according to claim 14 wherein said circuitry further encloses a display.

19. A method for monitoring an industrial machine comprising:
   providing an industrial machine;
   sensing at least one of temperature and pressure of said machine by an industrial sensing probe inserted through an opening in said machine;
   mounting a base socket to said sensing probe; and
   connecting a conversion circuit component as defined in claim 1 to said base socket using a quick connection.

20. A method according to claim 19 wherein said circuit can be removed from the base socket by performing not more than three separate acts.

* * * * *